(12) United States Patent
Ferguson (10) Patent No.: US 7,069,167 B2
(45) Date of Patent: Jun. 27, 2006

(54) FREQUENCY RESPONSE MEASUREMENT

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 46 days.

(21) Appl. No.: 10/780,786

(22) Filed: Feb. 18, 2004

(65) Prior Publication Data

US 2004/0161061 A1    Aug. 19, 2004

Related U.S. Application Data

(60) Provisional application No. 60/448,695, filed on Feb. 18, 2003.

(51) Int. Cl.
*H04L 27/14* (2006.01)

(52) U.S. Cl. .................................................. 702/109

(58) Field of Classification Search ............... 702/106, 702/109, 112, 75, 76; 704/200, 222, 209, 704/220, 2
See application file for complete search history.

(56) References Cited

U.S. PATENT DOCUMENTS 5,959,726 A * 9/1999 Riley et al. ............... 356/124.5
6,298,322 B1 * 10/2001 Lindemann ................. 704/222

* cited by examiner

*Primary Examiner*—John Barlow
*Assistant Examiner*—Cindy D. Khuu
(74) *Attorney, Agent, or Firm*—Francis I. Gray; Matthew D. Rabdau (57) ABSTRACT

A method of frequency response measurement for a sinusoidal test signal, such as a swept sinusoid signal, a multiburst sinusoidal signal or the like, uses a complex sinusoid window at a particular frequency for correlation with the sinusoidal test signal. The resulting complex correlation magnitude signal is thresholded as a function of a percentage of a maximum complex correlation magnitude. A centroid of the thresholded complex correlation magnitude signal is found, and the complex correlation magnitude at the centroid is the frequency response at the particular frequency.

1 Claim, 8 Drawing Sheets

FREQUENCY RESPONSE MEASUREMENT

CROSS-REFERENCE TO RELATED APPLICATIONS

This application claims the benefit of U.S. Provisional Application 60/448,695, filed Feb. 18, 2003.

BACKGROUND OF THE INVENTION

The present invention relates to signal measurement techniques, and more particularly to a method of frequency response measurement of sinusoidal test signals of various frequencies.

Figure 1:
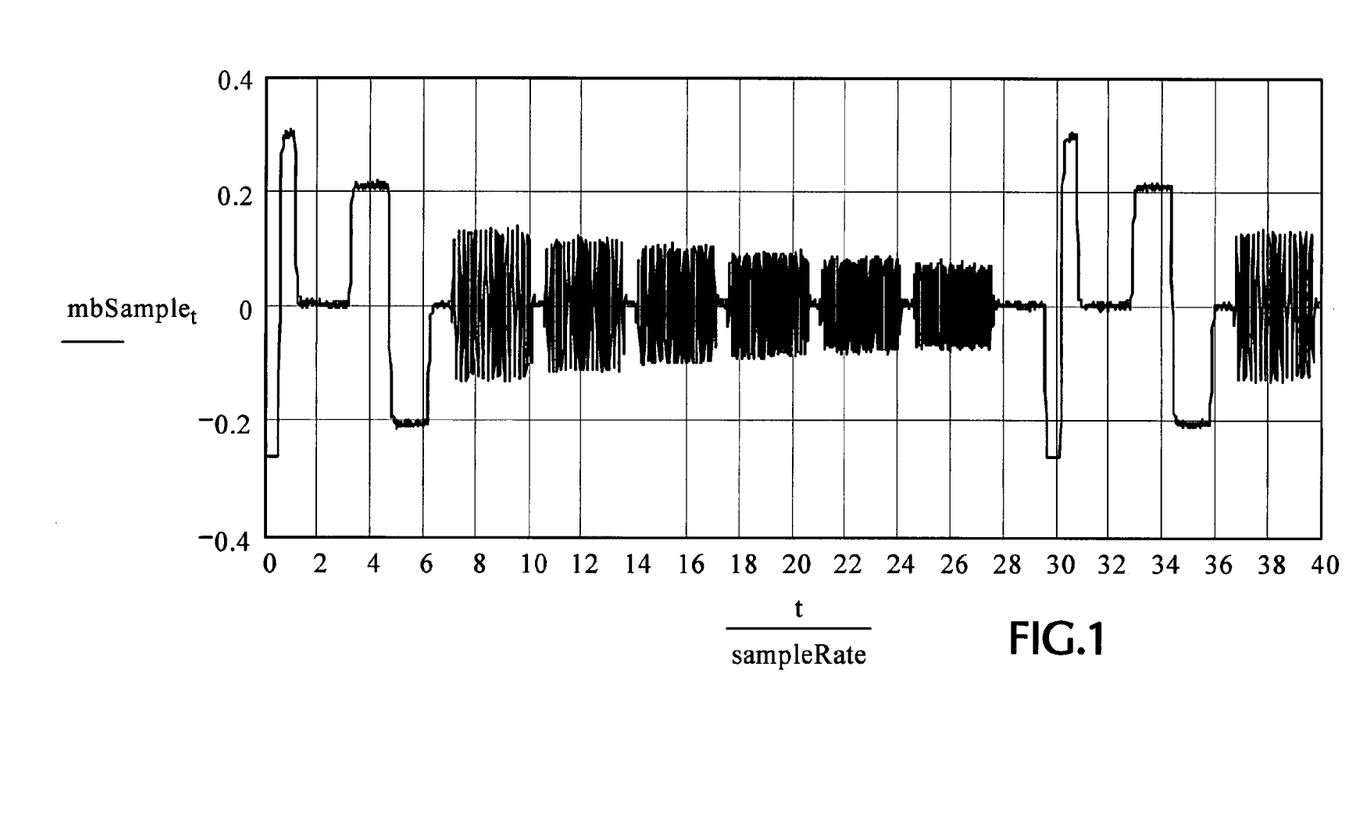
FIG. 1 is a graphic diagram view of a multiple-frequency burst test signal.

It is of interest to use an automated method of measuring the amplitude of sinusoidal test signals of various frequencies of analog and digital signals, such as video signals. Examples include packet or burst amplitudes of a "multi-burst" test signal, such as shown in FIG. 1, or the amplitude of a swept sinusoid signal at a particular frequency. Prior methods of measuring such signals either measure the peak, envelope, curve fitting or other derivative aspect of the amplitude of the multi-bursts. The prior methods for swept sinusoids generally use Fourier Transforms (FT), such as fast Fourier Transforms (FFT), discrete Fourier Transforms (DFT), etc. The peak methods are the most susceptible to errors due to noise and non-linear distortions. The envelope detection methods are less susceptible to noise, but are not robust in the presence of non-linear distortions. The FT methods are useful for relative amplitude measurements of a linear sweep, but do not allow a direct measurement of absolute amplitude for a portion of a sweep or multi-burst at a particular frequency. Also even FT methods optimized for speed, such as FFTs, are relatively computationally expensive if only one or a few frequencies are of interest.

It is desired to have one method of frequency measurement that is robust in the presence of random noise, quantization error, MPEG impairments and other non-linear distortions and interference. Also desired is a method of determining a figure of merit correlated to the probable accuracy of the frequency measurement due to impairments, such as those from MPEG and/or noise. Further it is desired that the frequency measurement work with sinusoidal test signal components, such as bursts, with various time windows—duration and envelope shape, burst spacing, etc.— and with a swept sinusoid. Finally it is desired that the method works with different video standards, such as YPbPr, RGB, high definition, standard definition and computer video, and with variable sample rates not necessarily known a priori or related to a clock rate of the corresponding digitized video.

BRIEF SUMMARY OF THE INVENTION

Accordingly the present invention provides a frequency response measurement automatic method for measuring the amplitude of sinusoidal test signals of various frequencies, such as individual packet or burst amplitudes or swept sinusoid amplitude at a particular frequency. The method uses a complex sinusoid window at a particular frequency for correlation with the sinusoidal test signal. The resulting complex correlation magnitude signal is thresholded as a function of a percentage of a maximum complex correlation magnitude. A centroid of the thresholded complex correlation magnitude signal is found, and the complex correlation magnitude at the centroid is the frequency response at the particular frequency.

The objects, advantages and other novel features of the present invention are apparent from the following detailed description when read in conjunction with the appended claims and attached drawing.

DETAILED DESCRIPTION OF THE INVENTION

Figure 2:
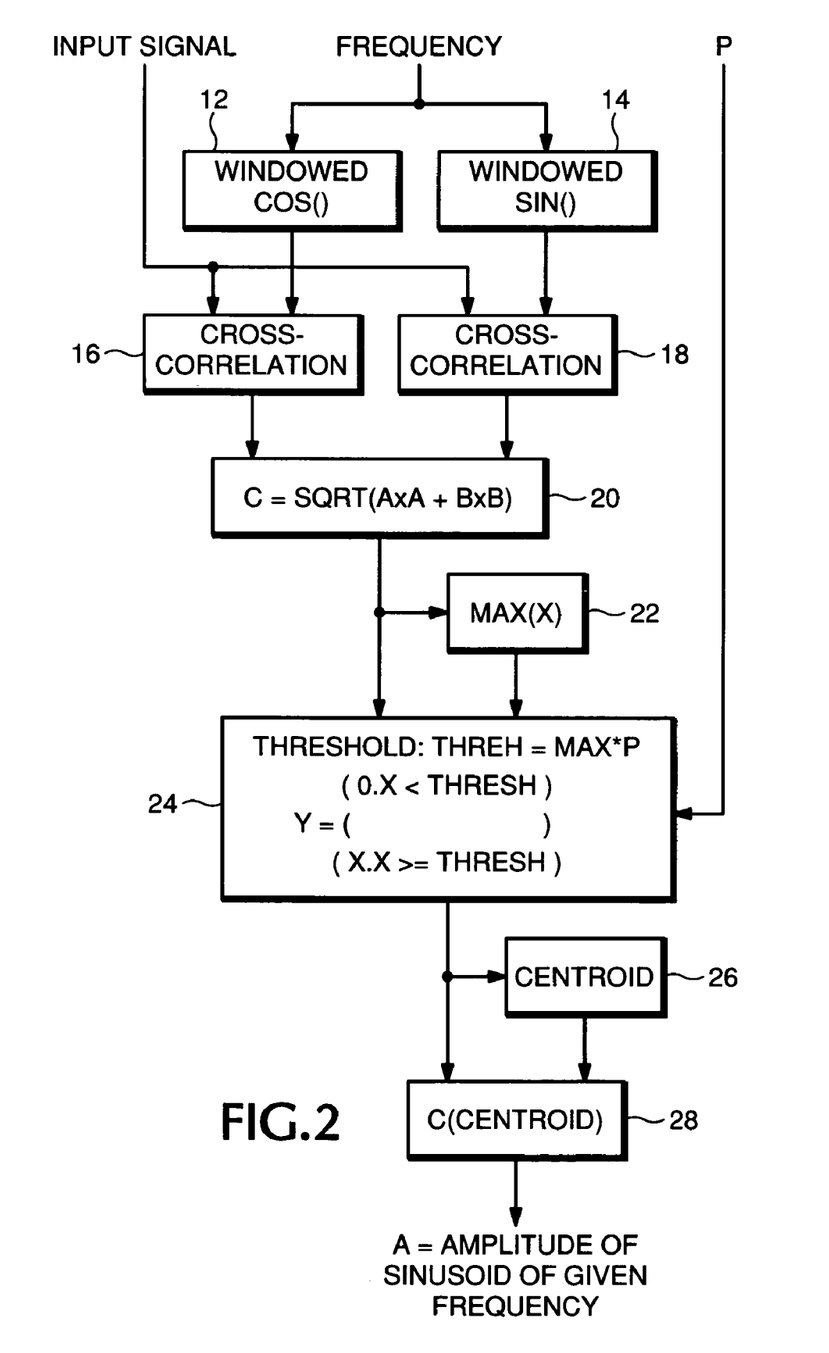
FIG. 2 is a logic block diagram view of a frequency response measurement method according to the present invention.
Figure 3:
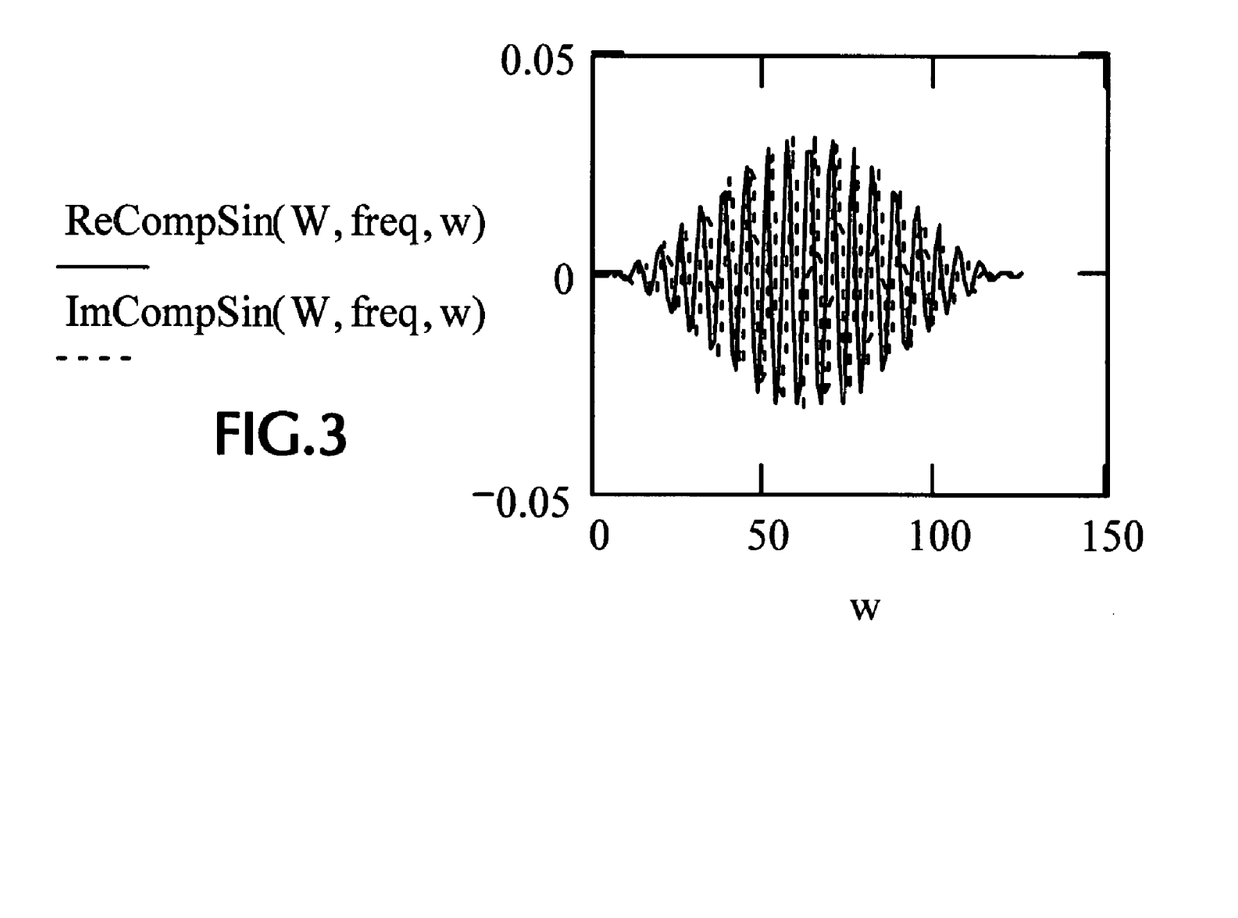
FIG. 3 is a windowed complex sinusoid for use in the frequency response measurement method according to the present invention.

Referring now to FIG. 2 windowed sin( ) and cos( ) functions 12, 14 representing a complex sinusoid, as shown in FIG. 3, are created at a particular frequency f. A window size is determined based on the particular frequency from which the windowed complex sinusoid is computed. More particularly the window size is a function of the sample rate divided by the particular frequency times a multiplier, which multiplier also is a function of the particular frequency and is selected from the group consisting of a nominal multiplier, 2, 1 or 0—if the particular frequency is greater than a first frequency the multiplier is the nominal multiplier, if greater than a second lower frequency the multiplier is 2, if greater than a third yet lower frequency the multiplier is 1, otherwise the multiplier is 0. From the window size a window factor is determined which is used to compute the complex sinusoid components of the windowed complex sinusoid.

Figure 4:
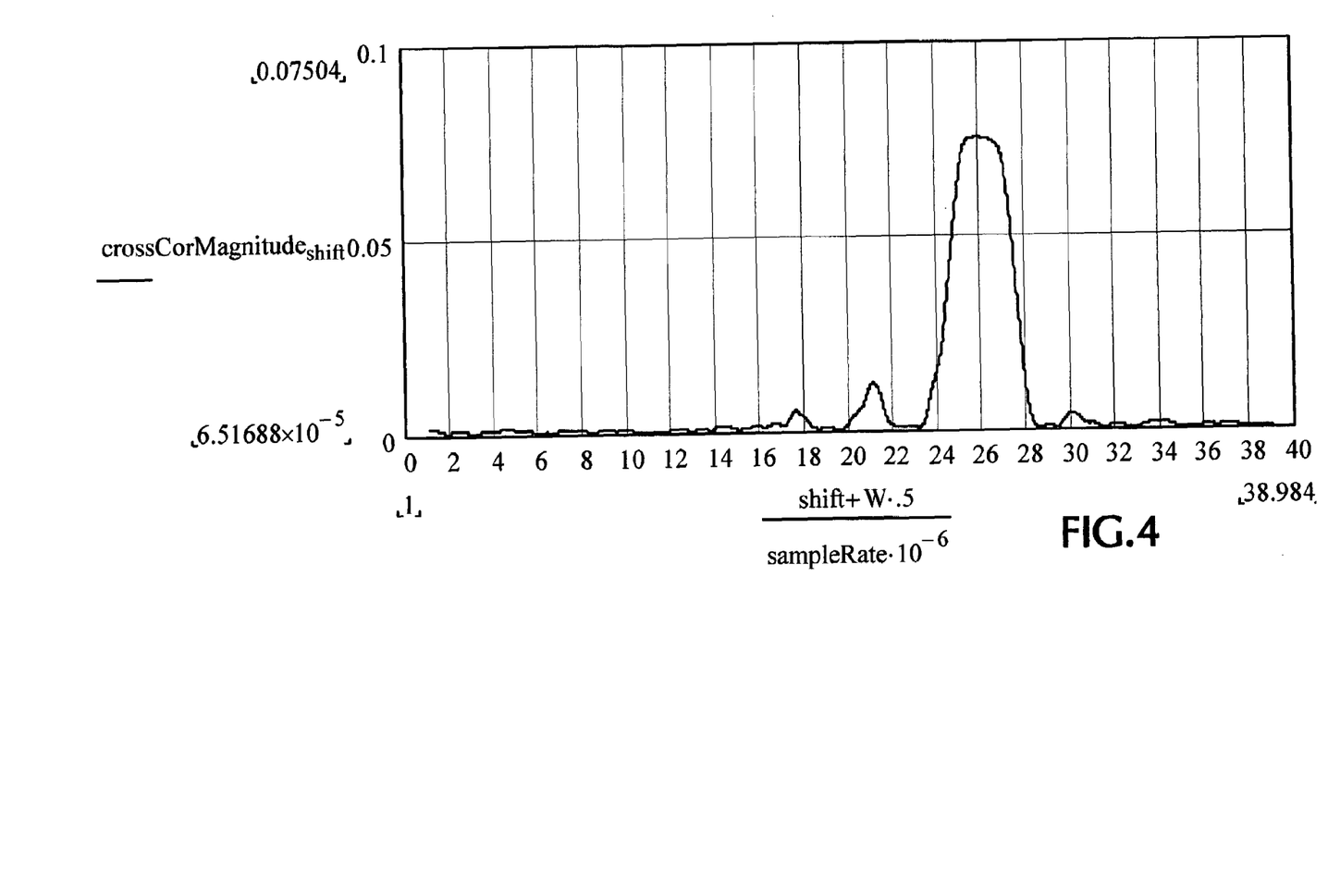
FIG. 4 is a graphic diagram view of the cross-correlation magnitude according to the present invention.
Figure 5:
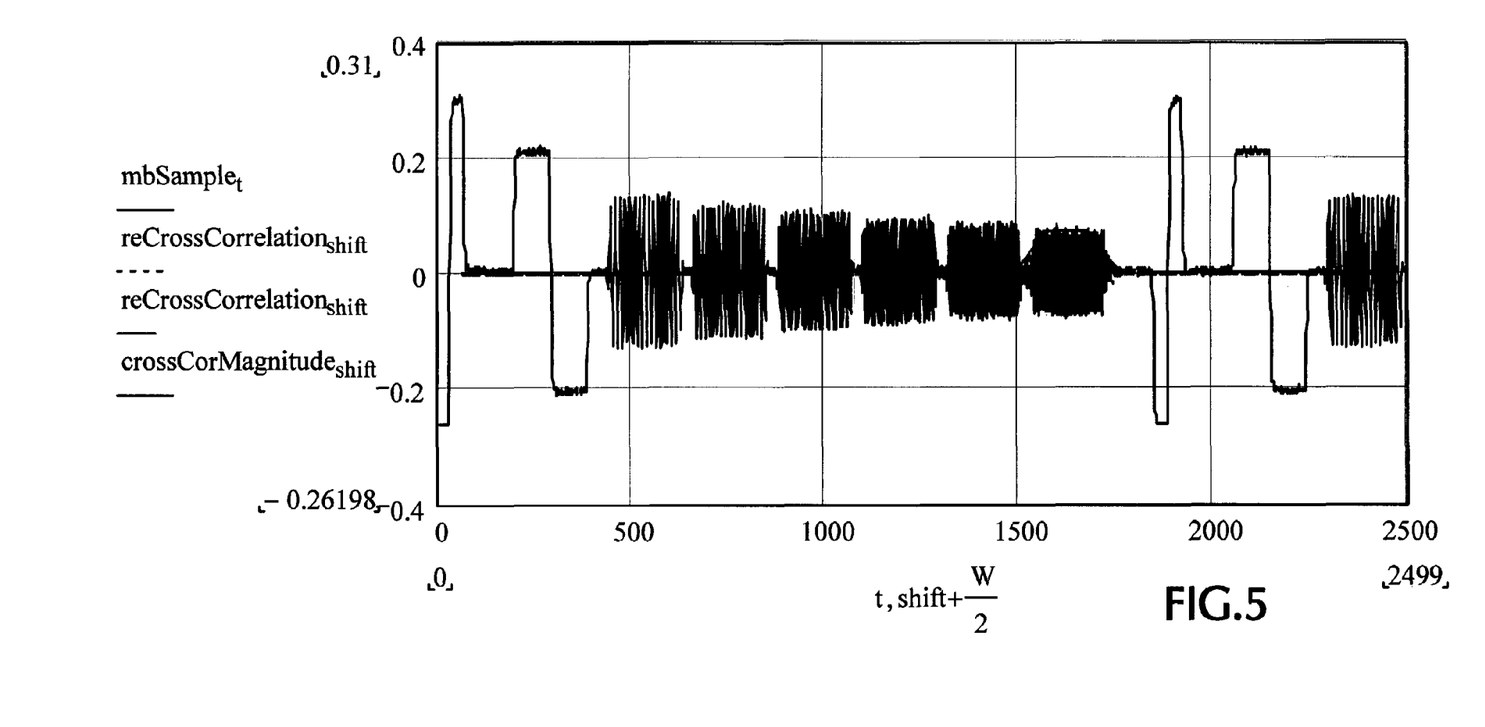
FIG. 5 is a graphic diagram view of the cross-correlation magnitude with relationship to the multiple-frequency burst test signal according to the present invention.
Figure 6:
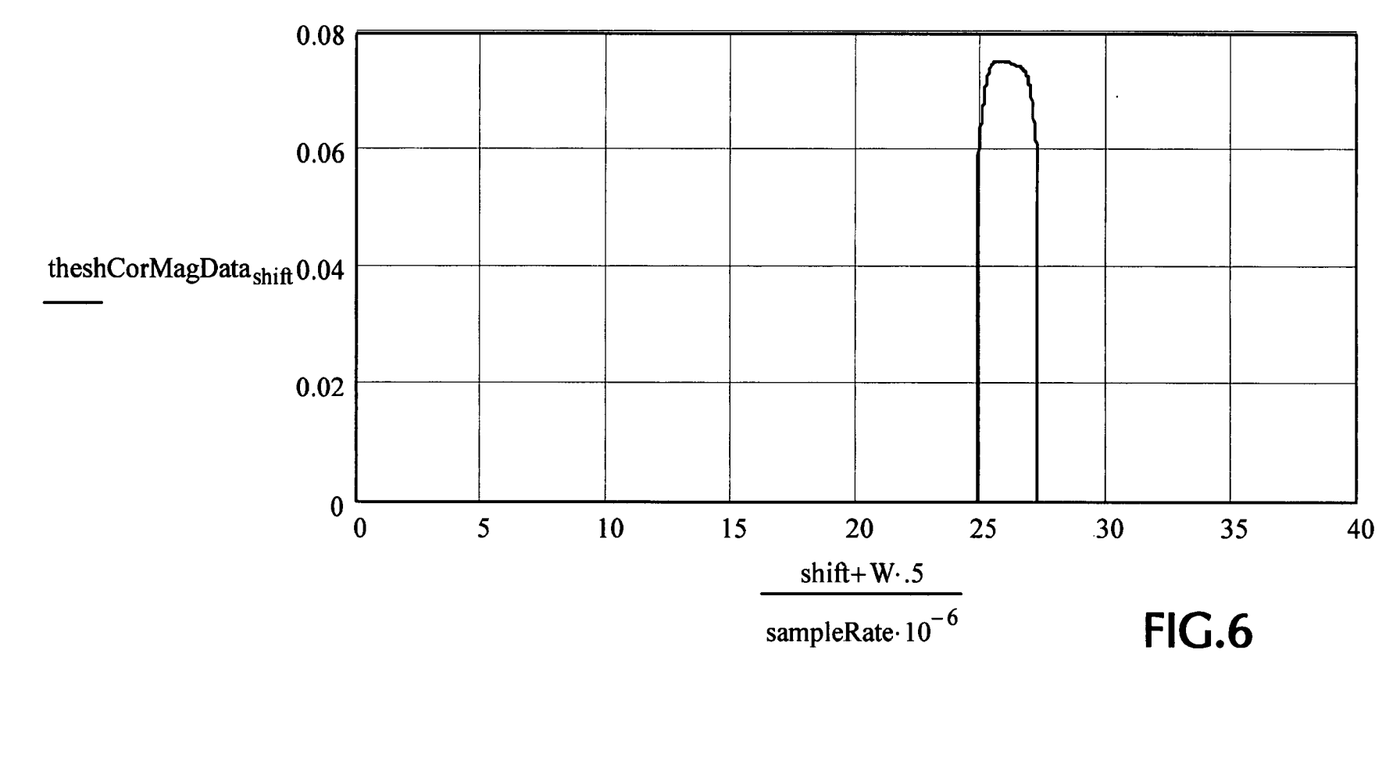
FIG. 6 is a graphic diagram view of a thresholded cross-correlation magnitude according to the present invention.
Figure 7:
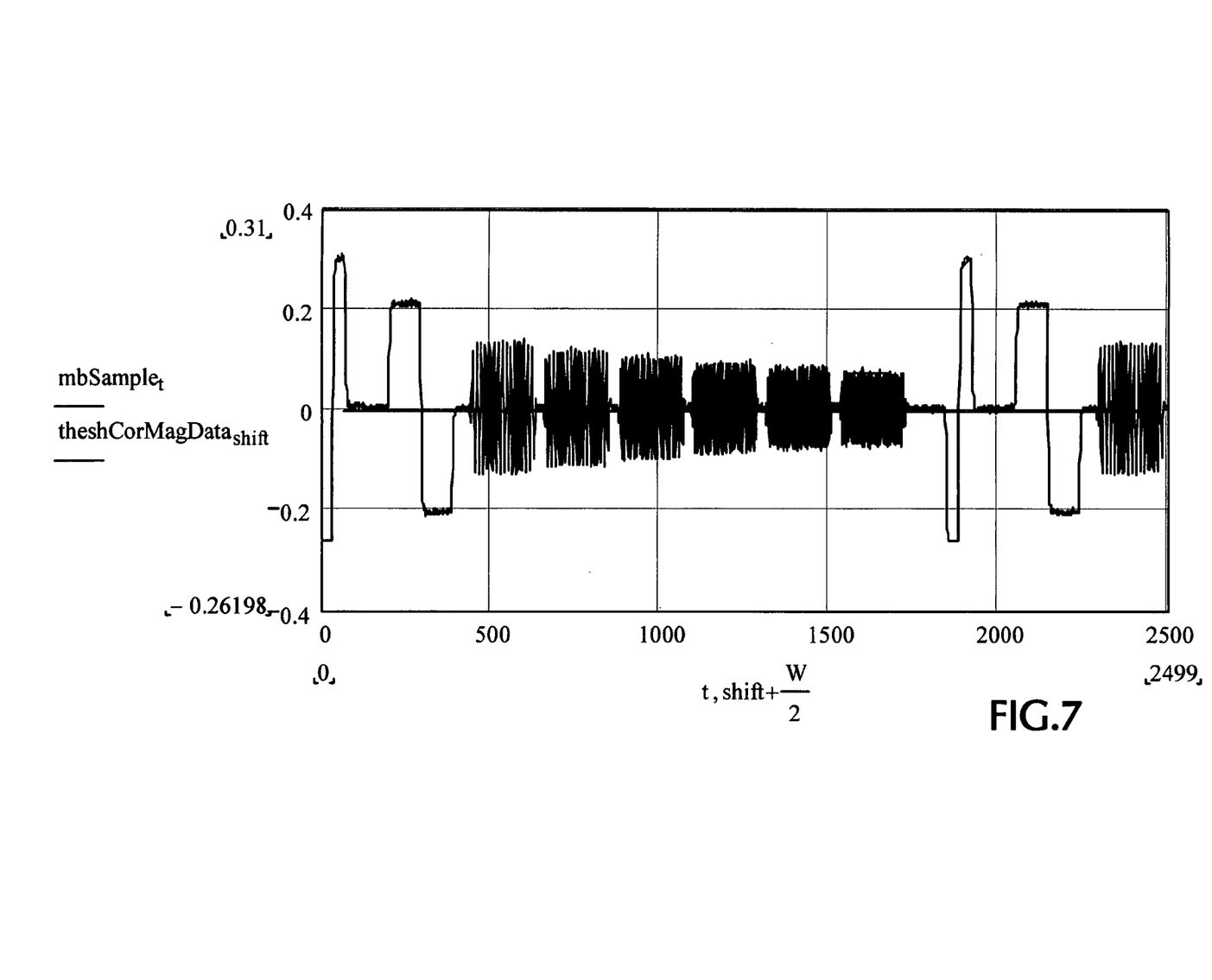
FIG. 7 is a graphic diagram view of the thresholded cross-magnitude with relationship to the multiple-frequency burst test signal according to the present invention.
Figure 8:
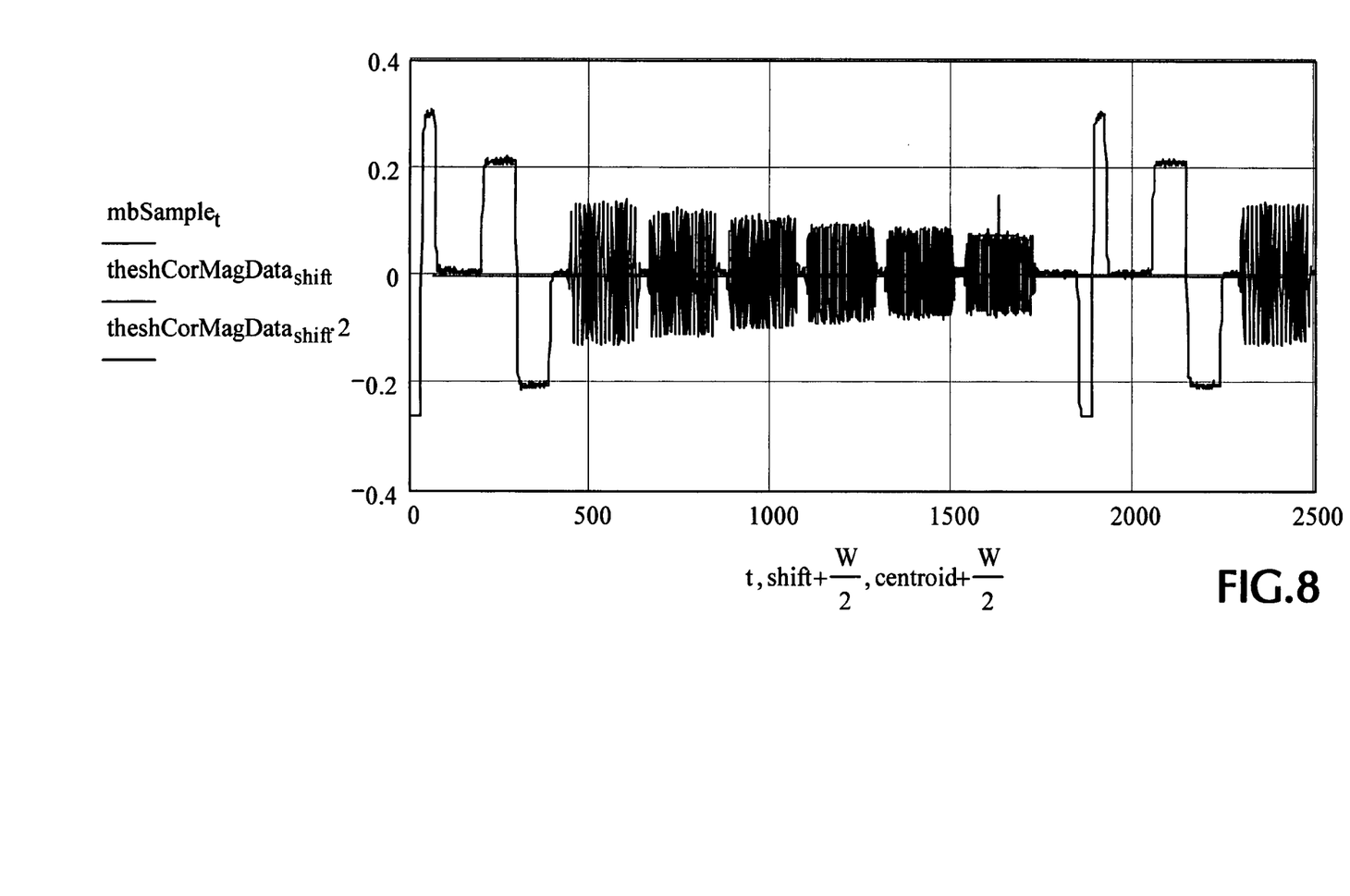
FIG. 8 is a graphic diagram view of a marker at the centroid of the thresholded cross-correlation magnitude with relationship to the multiple-frequency burst test signal according to the present invention.

The windowed complex sinusoid components are input to respective correlators 16, 18 together with an input sinusoidal test signal, either multi-burst or swept sinusoid signal, to produce a complex correlation 20, the magnitude of which is taken as the square root of the sum of the squares. In other words the windowed complex sinusoid, or each component, slides along the input signal and compared at all points thereof to produce the complex correlation 20. A maximum value M 22 of the complex correlation C 20 is obtained (see FIGS. 4 and 5) when the windowed complex sinusoid aligns with the corresponding burst or swept frequency range of the input signal (see FIGS. 6 and 7). The complex correlation C 20 is thresholded 24 using P percent of the maximum complex correlation M. See FIG. 8. A marker for the frequency f is found 26 via a centroid of the thresholded complex correlation magnitude. The frequency response at f is the complex correlation magnitude 28 at the marker.

Thus the present invention provides a frequency response measurement that is robust in the presence of noise and other impairments when sweeps, multi-bursts or similar sinusoidal signals are used, is able to qualify the accuracy of the measurement via a correlation coefficient taken as the input channel energy normalized maximum cross-correlation, and finds the frequency of interest among signal components in the signal, i.e., locates the frequency of interest on a video line containing a swept sinusoid.

What is claimed is:

1. A method of frequency response measurement comprising the steps of:

creating a windowed complex sinusoid at a particular frequency, said windowed complex sinusoid being a fundamental sinusoid (sin( )) and a 90° degree out-of-phase sinusoid (cos( ));

correlating an input sinusoidal test signal with the windowed complex sinusoid to produce a complex correlation magnitude signal;

thresholding the complex correlation magnitude signal as a function of a percentage of a maximum value for the complex correlation magnitude signal;

finding a centroid of the thresholded complex correlation magnitude signal; and determining the frequency response at the particular frequency as a magnitude of the complex correlation magnitude signal at the centroid.

* * * * *